United States Patent
Muszynski

(12) 
(10) Patent No.: US 6,204,584 B1
(45) Date of Patent: Mar. 20, 2001

(54) LOW COGGING TORQUE BRUSHLESS MOTOR ROTOR

(75) Inventor: Jerzy Muszynski, Nashua, NH (US)

(73) Assignee: Cleveland Motion Controls, Inc., Cleveland, OH (US)

( * ) Notice: Subject to any disclaimer, the term of this patent is extended or adjusted under 35 U.S.C. 154(b) by 0 days.

(21) Appl. No.: 09/483,902

(22) Filed: Jan. 18, 2000

(51) Int. Cl.[7] .............................. H02K 1/06; H02K 1/27; H02K 1/28
(52) U.S. Cl. ..................... 310/156; 310/261; 310/67 R; 310/42; 310/216
(58) Field of Search ................................ 310/261, 262, 310/156, 42, 272, 273, 67 R, 216

(56) References Cited

U.S. PATENT DOCUMENTS

| | | | |
|---|---|---|---|
| 3,164,735 | * 1/1965 | Lichowsky | 310/261 |
| 3,860,843 | 1/1975 | Kawasaki et al. | 310/67 |
| 4,091,300 | 5/1978 | Lynch et al. | 310/154 |
| 4,216,400 | 8/1980 | Lynch et al. | 310/154 |
| 4,341,969 | 7/1982 | Sievert | 310/154 |
| 4,424,463 | 1/1984 | Musil | 310/49 R |
| 4,477,744 | * 10/1984 | Gerber | 310/156 |
| 4,504,755 | 3/1985 | Semones et al. | 310/156 |
| 4,585,967 | * 4/1986 | Mayer et al. | 310/217 |
| 4,707,645 | 11/1987 | Miyao et al. | 318/254 |
| 4,748,359 | * 5/1988 | Yahara et al. | 310/156 |
| 5,065,063 | * 11/1991 | Watanabe | 310/156 |
| 5,498,917 | 3/1996 | Ninomiya et al. | 310/216 |
| 5,783,890 | 7/1998 | Mulgrave | 310/156 |
| 5,936,322 | 8/1999 | Yamaguchi et al. | 310/156 |

FOREIGN PATENT DOCUMENTS

| | | | |
|---|---|---|---|
| 63-121438 | * 5/1988 | (JP) | H02K/1/28 |
| 6-038416 | * 2/1994 | (JP) | H02K/1/28 |
| 7-322576 | * 12/1995 | (JP) | H02K/1/28 |
| 10-201152 | * 7/1998 | (JP) | H02K/1/28 |

* cited by examiner

Primary Examiner—Burton Mullins
(74) Attorney, Agent, or Firm—Vickers, Daniels & Young

(57) ABSTRACT

A low cogging torque permanent magnet rotor is provided including a shaft and a permanent magnet mounted on the shaft. A gap is provided between the shaft and the magnet near a boundary between the magnet poles thereby reducing the cogging torque as the rotor poles rotate past the poles of the motor stator.

33 Claims, 2 Drawing Sheets

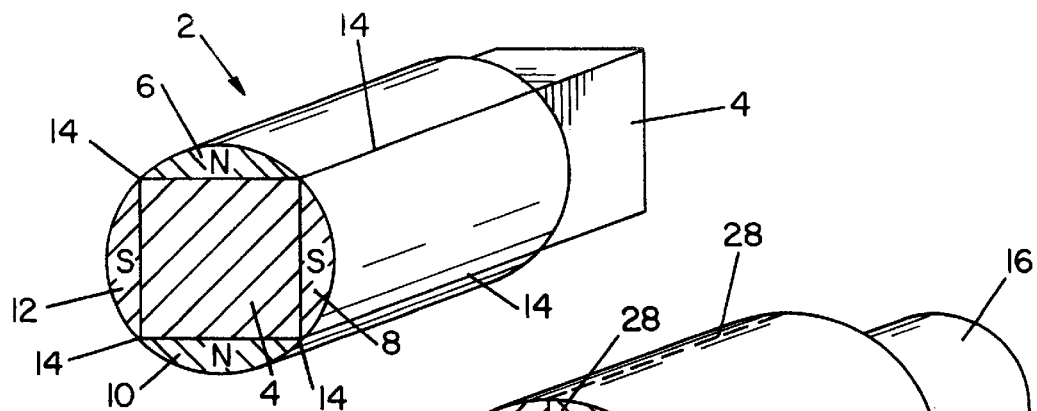
FIG. 1 (PRIOR ART)
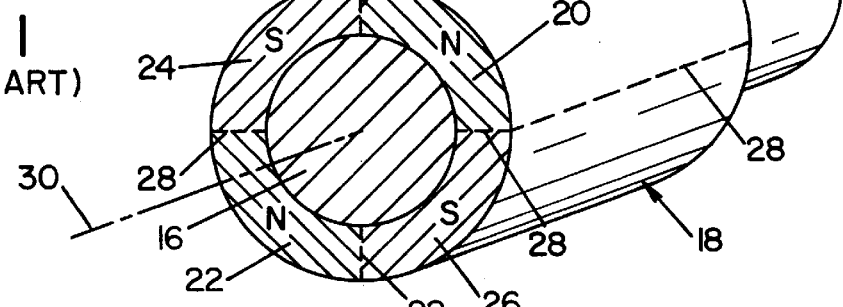
FIG. 2 (PRIOR ART)
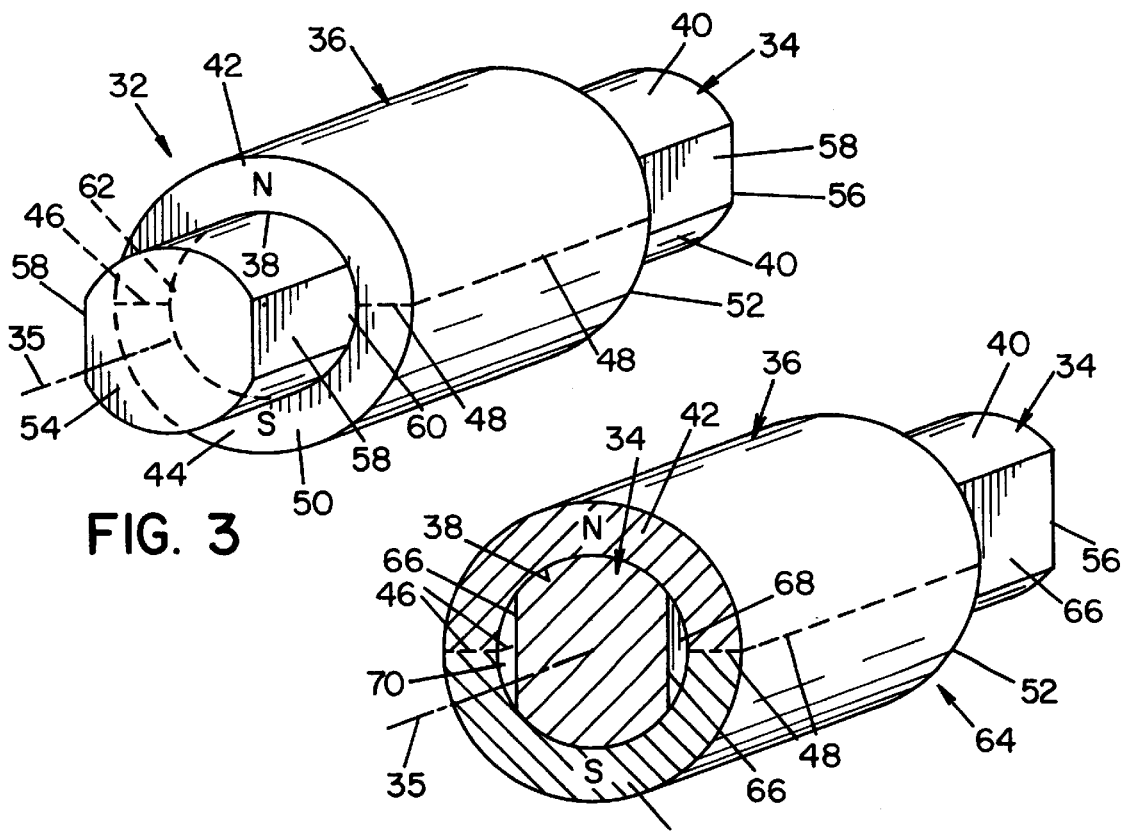
FIG. 3
FIG. 4

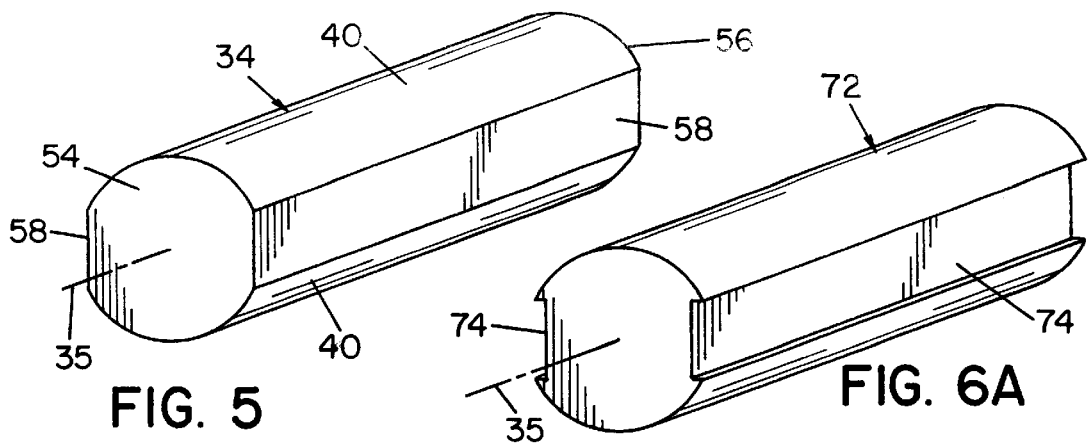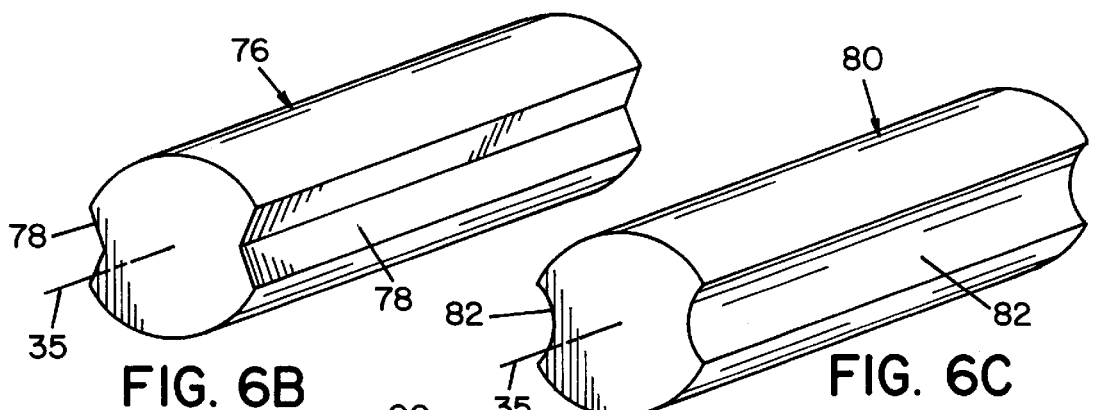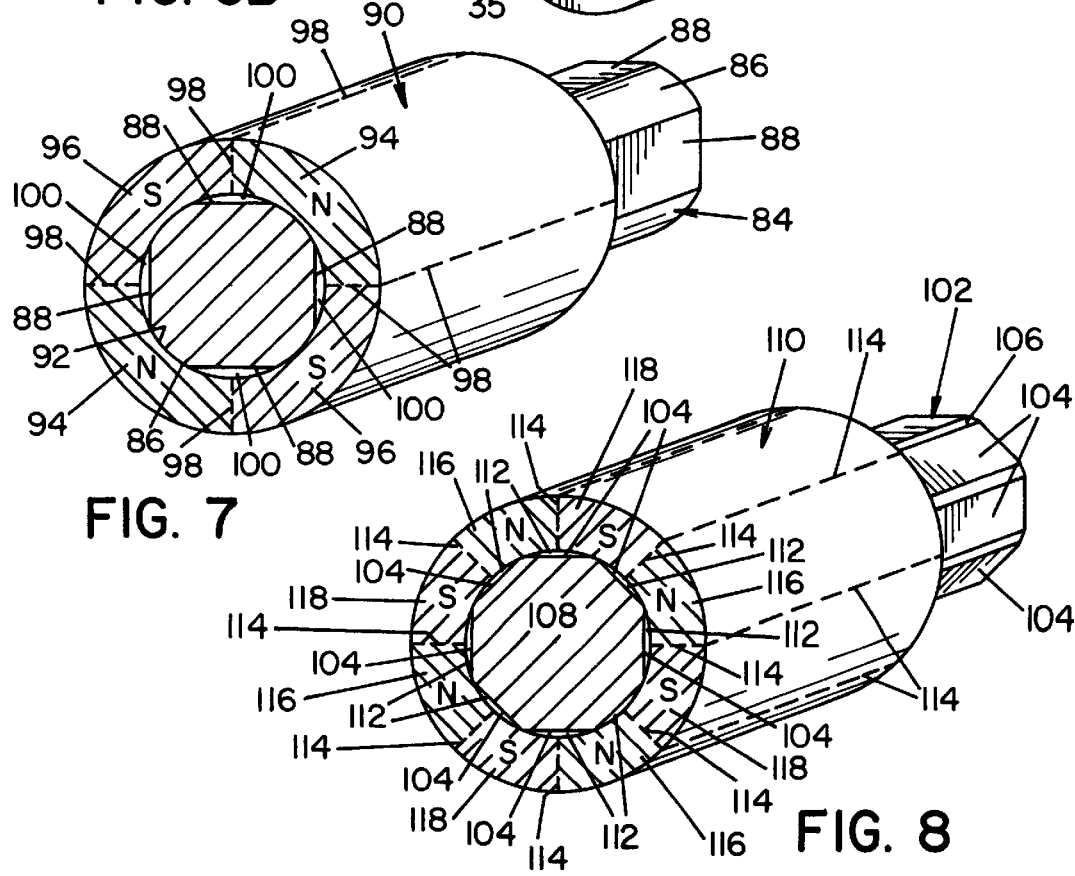

LOW COGGING TORQUE BRUSHLESS MOTOR ROTOR

INCORPORATION BY REFERENCE

The following United States patents are hereby incorporated herein by reference as background information: Yamaguchi, et al. U.S. Pat. No. 5,936,322; Mulgrave U.S. Pat. No. 5,783,890; Ninomiya, et al. U.S. Pat. No. 5,498,917; Miyao, et al. U.S. Pat. No. 4,707,645; Semones, et al. U.S. Pat. No. 4,504,755; Musil U.S. Pat. No. 4,424,463; Sievert U.S. Pat. No. 4,341,969; Lynch, et al. U.S. Pat. No. 4,216,400; Lynch, et al. U.S. Pat. No. 4,091,300; and Kawasaki, et al. U.S. Pat. No. 3,860,843.

The present invention relates to the art of electric motors and more particularly to a rotor for a low cogging torque, permanent magnet type, brushless motor.

The invention finds particular utility in connection with such permanent magnet DC motors and will be described with reference thereto; however, it will be appreciated that the present invention can be applied to other types of permanent magnet rotating machines.

BACKGROUND OF THE INVENTION

Brushless motors commonly include permanent rotor magnets with one or more pairs of poles having opposite magnetic polarity. In such motor configurations, the magnetic attraction between the rotor poles and the stator poles changes as the rotor rotates with respect to the stator. This variance in magnetic attraction as a function of rotor position is known as cogging. Several problems are caused by cogging, as discussed in the various patents above. Among these are a variable torque characteristic while the rotor is rotating, and the existence of preferred relative positions between the rotor and stator. In the first case, cogging results in decreased operational or steady-state efficiency. In the latter case, cogging reduces the ability to stop the motor in a desired position because the rotor tends to align itself into one of a limited number of positions relative to the stator poles. The ability to stop a motor at precise positions may be critical in certain control applications. In such situations where the desired rotational stopping position is not at a point of polar alignment, a motor subject to cogging effects may be inadequate or less desirable. Cogging results in torque and speed variations in permanent magnet electric motors due to the magnetic flux variations as the rotor poles move past the stator poles. In this regard, the cogging appears as a variable AC torque component. The reluctance of the motor air gap is significantly higher at the stator slots than at the pole teeth, thus causing cogging. A reduction in the reluctance variation will thus result in a reduction in cogging torque and its associated problems.

In a typical permanent magnet rotor, a single piece cylindrical magnet is mounted on a cylindrical shaft and charged to include at least one pair of poles having opposite polarity. This configuration, while economical to produce, suffers from high cogging torque. Heretofore, several different attempts have been made to reduce permanent magnet electric motor cogging effects, as discussed in the foregoing patents incorporated by reference. One method includes skewing the stator winding slots with respect to the permanent magnet pole edges, as shown in Musil U.S. Pat. No. 4,424,463. Another method involves skewing the permanent magnet pole pieces with respect to the stator winding slots. Cogging torque may also be reduced by providing a motor where the number of stator salient poles is less than the number of rotor permanent magnet poles as shown in Kawasaki, et al. U.S. Pat. No. 3,860,843. These practices, while reducing cogging effects, greatly complicate the manufacturing process, and correspondingly increase manufacturing costs. Another approach is shown in Sievert U.S. Pat. No. 4,341,969, wherein the edges of the permanent magnet pole pieces are cut or machined to form a series of notches on the leading and trailing edges of the stator poles. Similarly, in Mulgrave U.S. Pat. No. 5,783,890, the leading and trailing edges of the rotor permanent magnets are magnetized in a longitudinally varying magnetization strength pattern, while the central portion of each magnet is uniformly magnetized. Selective magnetization, like selective machining or forming of permanent magnets, increases the cost of manufacturing. Still another attempt at reducing cogging torque is where a rotor includes a square shaft and four section-shaped magnet pieces are attached to the flat outer surfaces of the square shaft. As discussed further hereinafter, this method significantly increases the manufacturing cost of permanent magnet rotors due to the specialized shape of the shaft and the use of separate magnet pieces. Consequently, there remains a need for an improved permanent magnet rotor which reduces cogging and adds little or no manufacturing costs.

SUMMARY OF THE INVENTION

In accordance with the present invention, there is provided a low cogging torque permanent magnet rotor by which the foregoing and other problems and disadvantages are minimized or overcome. More particularly, and in accordance with a principle aspect of the invention, there is provided a permanent magnet rotor including a longitudinal shaft with an outer surface, and an overlying magnet with an inner surface engaging at least a portion of the shaft outer surface and with at least two magnetic poles of opposite polarity adjacent one another at longitudinal pole boundaries. A gap is provided between the shaft and the magnet near at least one of the pole boundaries. In this regard, the gap between the shaft and the magnet effectively reduces the reluctance variation of the finished motor at the corresponding pole boundary. The lowered reluctance variation operates to reduce the cogging torque effects as the rotor magnetic poles rotate past the poles of the stator. Varying the gap dimensions allows control of the amount of cogging.

In accordance with another aspect of the invention, the shaft outer surface includes a contoured portion providing the gap between the shaft and the magnet near at least one pole boundary. In addition, the magnet may include multiple pairs of opposite polarity magnetic poles with pole boundaries therebetween and a gap between the magnet and the shaft near one, some, or all such pole boundaries.

In accordance with still another aspect of the invention, there is provided a method of manufacturing a low cogging torque permanent magnet rotor. The method includes providing a shaft with an outer surface and a magnet with an inner surface and at least two poles of opposite magnetic polarity with a pole boundary therebetween; and interengaging the shaft within the magnet with a gap therebetween near at least one of the pole boundaries. In this regard, the gap can be provided by contours in the shaft outer surface and/or the magnet inner surface to reduce the reluctance variations near the pole boundary.

It is accordingly a primary object of the present invention to provide an improved permanent magnet rotor by which electric machine cogging torque can be reduced.

Another object of the present invention is the provision of a rotor of the character described above which adds little or no manufacturing costs.

Yet another object of the present invention is the provision of a rotor of the character described above which can be easily customized according to desired cogging torque reduction and other motor performance characteristics.

Still another object of the present invention is the provision of a rotor manufacturing method by which a variety of low cogging torque rotors can be made quickly, at minimal cost, and with simple tooling.

BRIEF DESCRIPTION OF THE DRAWINGS

The foregoing and other objects and advantages will become apparent from the following description of preferred embodiments of the present invention illustrated in the accompanying drawings in which:

FIG. 1 is a perspective view, partially in section, showing a prior art rotor;

FIG. 2 is a perspective view, partially in section, showing a prior art rotor;

FIG. 3 is a perspective view showing a low cogging torque permanent magnet rotor in accordance with the invention;

FIG. 4 is a perspective view, partially in section, of a modified version of the rotor of FIG. 3;

FIG. 5 is a perspective view of a rotor shaft in accordance with the invention;

FIGS. 6A, 6B and 6C are perspective views of other embodiments of a rotor shaft according to the invention;

FIG. 7 is a perspective view, partially in section, of another embodiment of a rotor in accordance with the invention; and FIG. 8 is a perspective view, partially in section, of yet another embodiment of a rotor according to the invention;

DESCRIPTION OF PREFERRED EMBODIMENTS

Referring now to the drawings wherein the showings are for the purpose of illustrating preferred embodiments of the present invention only, and not for the purpose of limiting the same, FIGS. 1 and 2 show prior art permanent magnet rotors. The rotor 2 of FIG. 1 includes a square shaft 4 and four individual sector-shaped magnet pieces 6, 8, 10, and 12 attached to the shaft 4. This approach reduces cogging torque by reduced reluctance changes at pole boundaries 14 due to the reduction in magnet thickness near the boundaries 14. However, this solution requires multiple magnet pieces 6, 8, 10, and 12 and does not provide flexibility in adjustment of cogging torque. Moreover, a square shaft is required. This type of rotor is therefore undesirable because although the cogging torque is reduced, the cost of manufacturing is high. FIG. 2 illustrates a common permanent magnet rotor design. A cylindrical shaft 16 is installed within a cylindrical single piece magnet 18 having diametrically opposite north poles 20 and 22 and south poles 24 and 26. Magnet piece 18 is magnetized to obtain this magnet pole configuration either before or after assembly onto shaft 16. Imaginary pole boundaries 28 extend longitudinally through magnet piece 18 parallel with rotor axis 30. This rotor configuration provides significant cost savings over the rotor of FIG. 1. First, the cylindrical shaft 16 requires no special machining. Second, the single piece cylindrical magnet 18 is easy to produce, requiring no special machining as in some of the above mentioned configurations. In addition, magnet 18 can be magnetized by a relatively simple charging fixture. However, the rotor of FIG. 2 provides no cogging torque reduction.

FIG. 3 illustrates a two-pole permanent magnet rotor 32 in accordance with the invention including a shaft 34 having an axis 35 and a single piece magnet 36 having a cylindrical inner surface 38 engaging arcuate outer surface portions 40 of the shaft. The magnet 36 is magnetized to provide a north pole 42 and a diametrically opposite south pole 44 having imaginary pole boundaries 46 and 48 therebetween. Poles 42 and 44 as well as pole boundaries 46 and 48 extend longitudinally from first end 50 to second end 52 of the magnet. Magnet 36 may be magnetized either before or after being mounted on shaft 34. As best seen in FIG. 5, shaft 34 has axially spaced front and rear ends 54 and 56, respectively, and includes flats 58 between outer surface portions 40 and extending between ends 54 and 56. Flats 58 are aligned with pole boundaries 46 and 48 when magnet 36 is mounted on the shaft so as to create air gaps 60 and 62 between magnet 36 and shaft 34 along pole boundaries 48 and 46, respectively. In operation, gaps 60 and 62 reduce the reluctance variation as the magnetic poles 42 and 44 of rotor 32 rotate past the poles of an outlying stator, not shown.

The shaft flats are spaced from the magnet at or near the pole boundaries to reduce the reluctance variation as the rotor poles rotate past the poles of the motor stator. The resulting air gap between the shaft and the magnet may, but need not, intersect or span the pole boundary, so long as the proximity thereto is small relative to the circumferential spacing between adjacent boundaries. The shaft flats, moreover, need not extend the entire longitudinal length of a given pole boundary, and multiple flats can be provided proximal to an individual boundary. In this fashion, several shaft flats may be longitudinally aligned with a given pole boundary, wherein each flat extends only a portion of the longitudinal length of the boundary. Alternatively, the several longitudinally extending flats may be circumferentially skewed relative to each other and to the corresponding pole boundary such that some resulting gaps intersect the boundary and others do not, and/or such that gaps are provided on both circumferential sides of the boundary. Furthermore, the gaps need not be strictly longitudinal, as for example a gap which extends at a helical angle along the entire longitudinal length of the boundary, or a portion thereof. In this regard, a helical gap can be provided within the invention which has two ends not intersecting the pole boundary, which are on opposite circumferential sides thereof, and which intersects the boundary between the gap ends. In addition, the gaps may be longitudinally tapered having different longitudinal profiles at different longitudinal positions. As stated above, gaps may, but need not, be provided near each pole boundary. In this regard, different gap sizes may be provided at different pole boundaries, or angular skewing of gaps may be provided at some boundaries and not at others, or tapered gaps may be provided at some boundaries and not at others. Many combinations are possible. An air gap between the shaft and the magnet is thus provided, which can be easily manufactured by selectively removing material from the shaft outer surface, such as by machining and the like, prior to the installation of the magnet on the shaft. The shape orientation, positioning, size, and volume of the resulting gap can be easily modified or adjusted in the shaft machining process to achieve different cogging torque reduction characteristics. A single piece magnet can be employed and can be magnetized with simple low cost charging fixtures. The invention requires no skewing of magnet poles, no complicated magnetizing patterns, and no complex machining of the magnetic pole pieces to achieve cogging torque reduction; however, it will be realized that the invention is easily applicable to providing air gaps between a rotor shaft and a magnet where the magnet includes pole boundaries which are not strictly longitudinally aligned or which are skewed or where some complex pole configuration is used. The corresponding air gap between the shaft outer surface and the magnet may, but need not, be longitudinally coextensive with the length of a corresponding pole boundary. In general, the positioning and orientation of the gaps relative to the boundaries tend to effect the waveform shape of the cogging torque whereas the gap size and volume generally effect the amplitude of the cogging torque. It will be realized that many various positional interrelationships between the pole boundary and the air gap are possible in accordance with the invention which can be implemented to adjust or control the cogging torque reduction characteristics including waveform shape and amplitude. It will also be recognized that the gaps of the present invention can be designed to achieve or facilitate other motor or generator operational performance characteristics in combination with cogging torque reduction or control.

As one example of how the amount and/or character of cogging torque reduction can be varied by changing the size or volume of the air gap between the magnet 36 and shaft 34, a rotor 64 is shown in FIG. 4 with flats 66 between arcuate outer surface portions 40 of shaft 34 creating air gaps 68 and 70 between the shaft and magnet 36. Flats 66 are internally wider than flats 58, whereby gaps 68 and 70 are larger than gaps 60 and 62 in FIG. 3. The increased volume of gaps 68 and 70 further reduces the cogging torque of a finished motor. Further in this regard, the amount and/or character of cogging torque reduction can also be controlled by varying the shape or longitudinal profile of those portions of the shaft which are structured to cooperate with the inner surface of the magnet to provide the desired air gaps between the shaft and the magnet. As further examples of how the size, shape, and/or volume of the air gaps can be used to vary the cogging torque reduction, FIGS. 6A, 6B, and 6C illustrate other shaft shapes for providing the desired air gaps. In this respect, FIG. 6A shows a shaft 72 with diametrically opposed channel or trough-shaped indentations or channels 74 and FIG. 6B illustrates a shaft 76 having V-shaped indentations or channels 78. In FIG. 6C, a shaft 80 is shown having arcuate indentations or channels 82. These various shapes are easily machined into cylindrical shafts and enable a wide variety of air gap configurations, shapes, and sizes, including sectors, polygons, ovals, etc., each having its own unique effect on cogging torque reduction properties. The shaft embodiments of FIGS. 3–5 providing flats 58 and 66 may be the most economically efficient to make; however, other variants are possible.

The invention is equally applicable to motors having multiple pairs of opposite polarity magnetic poles. In this regard, the invention is applicable to any number of motor configurations having 2, 4, 6, 8, etc. poles. Moreover, corresponding air gaps may, but need not, be provided for each pole boundary. The air gap number, size, shape, volume, and orientation or position relative to a pole boundary, can also be different for different pole boundaries consistent with the invention. In this way, the cogging torque reduction capabilities may be optimized or varied in conjunction with other electric machine design parameters to achieve performance characteristics tailored for specific motor applications with little or no added cost. Variation of the size, shape, and volume of the air gaps may be accomplished by simply adjusting a CNC machine program to remove more or less material from the shaft, magnet, or from different locations on the shaft outer surface and/or magnet inner surface. The present invention therefore provides for flexibility of electric machine design as well as flexibility of manufacture, while adding minimal or no manufacturing cost. As illustrated in FIGS. 7 and 8, for example, the invention can be used in fabricating four and eight pole motors, respectively. Shaft 84 in FIG. 7 has arcuate outer surface portions 86 and four flats 88 therebetween and equally spaced around the circumference of shaft 84. Magnet 90 has a cylindrical inner surface 92 engaging outer surface portions 86 and comprises two north poles 94 and two south poles 96 defining four pole boundaries 98. Flats 88 create gaps 100 with inner surface 92 which bridge pole boundaries 98, thereby reducing the reluctance variation, and consequently the cogging torque, as the rotor poles 94 and 96 rotate past stator poles, not shown. Similarly, shaft 102 in FIG. 8 includes eight flats 104 between arcuate outer surface portions 106 which engages cylindrical inner surface 108 of magnet 110 creating eight corresponding gaps 112 between the flats 104 and inner surface 108. These gaps 112 are equally spaced and span pole boundaries 114 defined by alternating north poles 116 and south poles 118 in magnet 110 and serve to reduce cogging torque. The rotor of the present invention provides the advantages in cost, manufacturing flexibility, and design flexibility as discussed above, and further allows the manufacture of reduced cogging torque permanent magnet motors with a wide variety of performance characteristics without extensive retooling or fixturing.

Referring now to FIGS. 3 and 5, a permanent magnet rotor according to the invention can be easily manufactured without extensive or complicated machining, tooling, or charging fixtures. In this respect, prior to assembly of shaft 34 into magnet 36, flats 58 are formed on shaft 34 by machining or other material removal techniques as are known. Magnet 36 is magnetized by a simple charging fixture, not shown, to create north and south poles 42 and 44, respectively. Shaft 34 is then installed within magnet 36 such that flats 58 are generally aligned with pole boundaries 46 and 48, thus providing air gaps 62 and 60, respectively between surfaces 38 and flats 58. It will be realized that the charging of magnet 36 may alternatively be performed after the installation of shaft 34. Furthermore, it will be appreciated that gaps 60, 62, 68, 70, 100, and 112 need not be strictly aligned with the various pole boundaries 48, 46, 98, and 114, nor be longitudinally coextensive therewith in order to achieve the desired reduction in cogging torque, nor need there be an air gap associated with every pole boundary. The relative orientation of pole boundaries and air gaps is not critical provided a gap is near a pole boundary. It will be further understood that while the embodiment of FIG. 3 shows shaft ends 54 and 56 extending beyond the magnet ends 50 and 52, other embodiments are possible where magnet ends 50 and/or 52 are coextensive with or extend beyond ends 54 and 56 of shaft 34. Moreover, it will be recognized as within the scope of the present invention to provide gaps between a rotor shaft and a rotor magnet through providing contours in one or both of the magnet inner surface and the shaft outer surface. The gaps resulting from these contours can have many different profiles other than those of the embodiments shown and described herein within the scope of the invention.

As many possible embodiments of the present invention may be made and as many possible changes may be made in the embodiment set forth herein, it is to be understood that the foregoing descriptive matter is to be interpreted merely as an illustration of specific embodiments of the invention, and not as a limitation thereof. It is accordingly applicant's intent to include all embodiments within the scope of the accompanying claims and all equivalents thereof.

Having thus described the invention, the following is claimed:

1. A rotor for use in a low cogging torque brushless motor with an outlying stator, said rotor comprising:
   a shaft rotatable about a longitudinal axis having longitudinally spaced front and rear ends and a radially outer surface;
   a magnet having a radially inner surface engaging said outer surface of said shaft an outer surface radially outwardly of said inner surface, and at least two magnetic poles having different magnetic polarities circumferentially adjacent one another at a pole boundary; and
   said shaft and said magnet near said pole boundary having an air gap therebetween, said air gap including a contoured portion on said shaft.

2. The rotor of claim 1, wherein said contoured portion is flat.

3. The rotor of claim 1, wherein said contoured portion is arcuate and convex with respect to said axis.

4. The rotor of claim 1, wherein said contoured portion is V-shaped and convex with respect to said axis.

5. The rotor of claim 1, wherein said contoured portion is a channel opening radially outwardly with respect to said axis.

6. The rotor of claim 5, wherein said channel includes a flat inner surface and two longitudinally extending sides extending radially outwardly from said inner surface and perpendicular therewith.

7. The rotor of claim 1, wherein said contoured portion extends between said front and rear ends.

8. The rotor of claim 1, wherein said contoured portion is parallel with said longitudinal axis.

9. The rotor of claim 1, wherein said air gap intersects said pole boundary.

10. The rotor of claim 1, wherein said air gap includes a plurality of contoured portions on said shaft.

11. The rotor of claim 1, wherein said air gap has longitudinally spaced first and second ends.

12. The rotor of claim 1, wherein said air gap is parallel with said longitudinal axis.

13. The rotor of claim 1, said magnet including at least four magnetic poles and at least four pole boundaries.

14. A rotor for use in a low cogging torque brushless motor with an outlying stator, said rotor comprising:
   a shaft rotatable about a longitudinal axis having longitudinally spaced front and rear ends and a radially outer surface;
   a magnet having a radially inner surface engaging said outer surface of said shaft, an outer surface radially outwardly of said inner surface, and at least two magnetic poles having different magnetic polarities circumferentially adjacent one another at a pole boundary;
   means for providing an air gap between said shaft and said magnet near said pole boundary; and,
   said air gap being circumferentially aligned with said pole boundary.

15. A rotor for use in a low cogging torque brushless motor with an outlying stator, said rotor comprising:
   a shaft rotatable about a longitudinal axis having longitudinally spaced front and rear ends and a radially outer surface;
   a magnet having a radially inner surface engaging said outer surface of said shaft, an outer surface radially outwardly of said inner surface, and at least two magnetic poles having different magnetic polarities circumferentially adjacent one another at a pole boundary; and
   means for providing a plurality of air gaps between said shaft and said magnet near said pole boundary.

16. A rotor for use in an electric motor, and rotatable about a longitudinal axis, said rotor comprising:
   a magnet having radially spaced outwardly facing and inwardly facing surfaces, axially spaced first and second ends, and at least two magnetic poles of different magnetic polarities circumferentially adjacent one another at a pole boundary; and
   a shaft having an outer periphery including a first portion engaging said inwardly facing surface, and a second portion spaced inwardly from said first portion configured to define a circumferentially discontinuous and discrete air gap therebetween near said pole boundary.

17. The rotor of claim 16, said gap having a rounded radial profile with respect to said axis.

18. The rotor of claim 16, said magnetic poles extending axially between said first and second ends and radially between said inwardly facing and outwardly facing surfaces.

19. The rotor of claim 18, said gap having a rounded radial profile with respect to said axis.

20. A rotor for use in an electric motor, and rotatable about a longitudinal axis said rotor comprising:
   a magnet having radially spaced outwardly facing and inwardly facing surfaces, axially spaced first and second ends, and at least two magnetic poles of different magnetic polarities circumferentially adjacent one another at a pole boundary;
   a shaft having an outer periphery including a first portion engaging said inwardly facing surface, and a second portion spaced inwardly from said inwardly facing surface and defining an air gap therebetween near said pole boundary, said gap having a rounded radial profile with respect to said axis, and said second portion of said outer periphery being convex with respect to said axis.

21. A rotor for use in an electric motor, and rotatable about a longitudinal axis, said rotor comprising:
   a magnet having radially spaced outwardly facing and inwardly facing surfaces, axially spaced first and second ends, and at least two magnetic poles of different magnetic polarities circumferentially adjacent one another at a pole boundary; and
   a shaft having an outer periphery including a first portion engaging said inwardly facing surface, and a second portion spaced inwardly from said inwardly facing surface and defining an air gap therebetween near said pole boundary, and said gap having a polygonal radial profile with respect to said axis.

22. The rotor of claim 21, wherein said second portion of said outer periphery is V-shaped and convex with respect to said axis.

23. The rotor of claim 21, wherein said second portion of said outer periphery is channel shaped and outwardly opening with respect to said axis.

24. A rotor for use in an electric motor, and rotatable about a longitudinal axis, said rotor comprising:
   a magnet having radially spaced outwardly facing and inwardly facing surfaces, axially spaced first and second ends, and at least two magnetic poles of different magnetic polarities circumferentially adjacent one another at a pole boundary; and
   a shaft having an outer periphery including a first portion engaging said inwardly facing surface, and a second portion spaced inwardly from said inwardly facing surface and defining an air gap therebetween near each pole boundary, each gap having a discrete profile extending about a sector of the shaft's periphery.

25. The rotor of claim 24, wherein said second portion of said outer periphery is V-shaped and convex with respect to said axis.

26. A rotor for use in an electric motor, and rotatable about a longitudinal axis, said rotor comprising:

a magnet having radially spaced outwardly facing and inwardly facing surfaces, axially spaced first and second ends, and at least two magnetic poles of different magnetic polarities circumferentially adjacent one another at a pole boundary; and a shaft having an outer periphery including a first portion engaging said inwardly facing surface, and a second portion spaced inwardly from said inwardly facing surface and defining an air gap therebetween near said pole boundary, said magnetic poles extending axially between said first and second ends and radially between said inwardly facing and outwardly facing surfaces, and said gap having a polygonal radial profile with respect to said axis.

27. A rotor for use in an electric motor, and rotatable about a longitudinal axis, said rotor comprising:

a magnet having radially spaced outwardly facing and inwardly facing surfaces, axially spaced first and second ends, and at least two magnetic poles of different magnetic polarities circumferentially adjacent one another at a pole boundary; and a shaft having an outer periphery including a first portion engaging said inwardly facing surface, and a second portion spaced inwardly from said inwardly facing surface and defining an air gap therebetween near said pole boundary, said magnetic poles extending axially between said first and second ends and radially between said inwardly facing and outwardly facing surfaces, and said gap having a discrete profile with respect to said axis extending about a sector of said shaft.

28. A method of manufacturing a rotor for use in a low cogging torque brushless motor comprising;

(a) providing a shaft having an axis, an outer surface, and axially opposite front and rear ends;

(b) providing an annular magnet having axially spaced first and second ends and having an inner surface;

(c) magnetizing said magnet to have at least two magnetic poles of opposite polarity circumferentially adjacent one another at a pole boundary;

(d) engaging said outer surface with said inner surface; and (e) providing an air gap between said outer and inner surfaces near said pole boundary by providing a contoured portion in said outer surface of said shaft.

29. The method of claim 28, said contoured portion having a flat axial profile.

30. The method of claim 28, said contoured portion having an arcuate axial profile.

31. The method of claim 28, said contoured portion having a V-shaped axial profile.

32. The method of claim 28, said contoured portion extending axially between said first and second ends.

33. A method of manufacturing a rotor for use in a low cogging torque brushless motor comprising;

(a) providing a shaft having an axis, an outer surface, and axially opposite front and rear ends;

(b) providing an annular magnet having axially spaced first and second ends and having an inner surface;

(c) magnetizing said magnet to have at least two magnetic poles of opposite polarity circumferentially adjacent one another at a pole boundary;

(d) engaging said outer surface with said inner surface; and (e) providing an air gap between said outer and inner surfaces near said pole boundary, said gap having a profile extending about a discrete section of the shaft.

* * * * *